Fig. 1.

JOHN K. JACKSON,
WILLIAM D. WHITAKER,
INVENTORS.

BY John H.J. Wallace

Fig. IA.

JOHN K. JACKSON,
WILLIAM D. WHITAKER,
INVENTORS.

3,046,738
COORDINATED FUEL AND TURBINE INLET CONTROL RESPONSIVE TO COMBUSTION GAS TEMPERATURE AND SPEED
John K. Jackson and William D. Whitaker, Phoenix, Ariz., assignors to The Garrett Corporation, Los Angeles, Calif., a corporation of California
Filed May 20, 1957, Ser. No. 660,349
22 Claims. (Cl. 60—39.25)

The present invention relates to a gas turbine control system, and more particularly to a control system for a gas turbine motor.

The term "gas turbine motor," as defined herein, identifies an engine having a hot gas turbine useful as a prime mover, and which receives compressed air from any suitable source to support combustion in communication with the inlet of the turbine. Such gas turbine motors do not drive a compressor for supplying compressed air to support combustion at the inlet of the turbine. Gas turbine motors which utilize any convenient source of compressed air for supporting combustion of fuel therein, generally operate on compressed air which is regulated at a desired pressure compatible with the operating conditions of the turbine and the combustion system thereof. The control systems of such engines cannot, therefore, operate according to the pressure of the compressed air entering the turbine to compensate for increases in load and/or speed of the turbine.

From the foregoing, it will be understood that a gas turbine motor as defined herein, requires certain control features which may not be common to conventional gas turbine compressors, but which may be used thereon in accordance with some design requirements.

According to the present invention, a gas turbine motor is controlled according to desired maximum speed and temperature conditions. A speed-sensing device operates a variable area nozzle at the inlet of the turbine, and a temperature-sensing device operates a fuel system for the turbine. A reset means is influenced by the speed-sensing device and exercises interim control of the fuel during transient conditions of the temperature-sensing devices which may function more slowly than the speed-sensing device.

Temperature protection for the turbine is maintained by thermostatic controls at the inlet and the outlet of the turbine, either of which is disposed to cause a reduction in the amount of fuel delivered to the gas turbine combustor. In the event of an over temperature condition, which may be induced by an overload of the turbine or due to an abruptly reduced load thereon, the thermostatic controls will reduce the amount of fuel delivered to the combustor.

It is an object of the invention to provide a control system for a gas turbine motor which tends to maintain the same at optimum operating conditions.

Another object of the invention is to provide a novel control system wherein a speed responsive function causes interim control of a gas turbine fuel system during transient conditions of the thermostats, which normally control said fuel system.

Another object of the invention is to provide a novel fuel control system for a gas turbine wherein thermostats are disposed at the inlet and the outlet of the turbine in order that either thermostat may influence the amount of fuel utilized to operate the turbine, in accordance with various loads imposed thereon.

Another object of the invention is to provide a novel control system, particularly adapted to control gas turbine motors, and which does not rely upon pressure changes at the inlet of the turbine for controlling its fuel system.

Another object of the invention is to provide a novel control system for gas turbines wherein a speed sensor is driven by the turbine and is coupled to a servo mechanism disposed to operate a variable area nozzle which maintains speed control of the turbine, while thermostats sensing the temperature of the turbine control the amount of fuel used to operate the turbine.

Other objects and advantages of the invention will be apparent from the following specification, appended claims and accompanying drawings, in which:

As shown in the drawings, a gas turbine motor 7 drives a power output shaft 8, to which is connected a speed sensor 9. This speed sensor 9 controls a servo mechanism 10 having an actuating arm 11 coupled to a variable area nozzle 12 disposed at the inlet of a turbine wheel 13 of the gas turbine motor 7. The variable area nozzle 12 controls flow of gas, delivered from a combustor 14, through the turbine wheel 13.

Figures 2, 3:
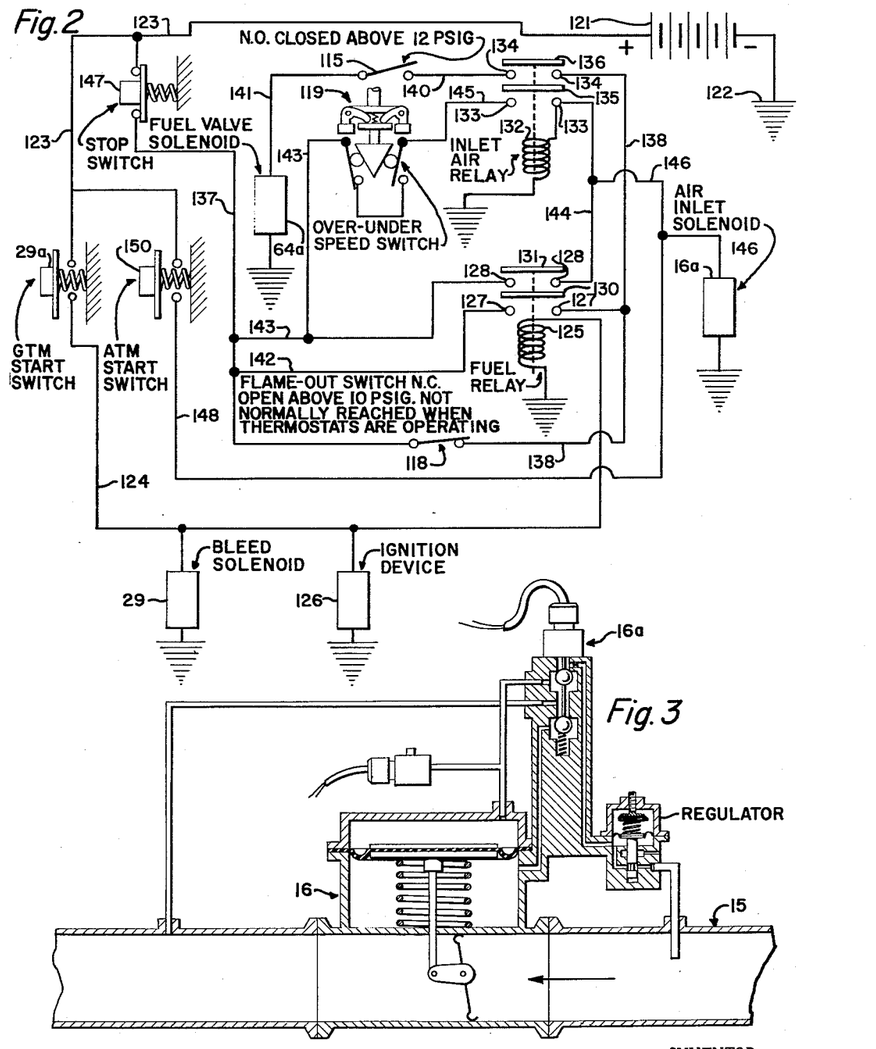
FIG. 2 is a diagrammatic view showing the electrical circuit used in the control system illustrated in FIGS. 1 and 1A.
FIG. 3 is a schematic view of a pressure regulating and shutoff valve used in the control system.

A conventional pressure regulating and flow controlling valve 16, shown schematically in FIG. 3, communicates with a conduit 15 and controls the pressure and flow of air or other fluid oxidizer delivered from a suitable source (not shown) to the combustor 14 and the variable area nozzle 12. The valve 16 is actuated by a solenoid 16a, being closed when the solenoid is de-energized and vice versa. As will be hereinafter described in detail, thermostats 22 and 38 sense temperature at the inlet and the outlet of the turbine wheel 13 respectively and are coupled to a fuel control 17. The fuel control 17 in turn regulates the amount of fuel delivered to the combustor 14, according to thermal conditions of the gas turbine motor 7.

Conduits 18 and 19, as will be hereinafter described in detail, interconnect a reset means, operable by the servo-mechanism 10, to effect the operation of the fuel control 17 in response to a speed change of the turbine wheel 13, which speed change may be caused by a change of load represented by the block X imposed upon the turbine. The reset means operates the fuel control 17 during an interim period in which the thermostats at the inlet and outlet of the turbine wheel 13 are in transient operating condition following a load change on the turbine.

Referring to the details of the gas turbine motor 7, and fuel control 17, as shown in the drawings, it will be seen that a fuel nozzle 20 is disposed to admit fuel into the combustor 14. The combustor 14 in turn communicates with a turbine inlet plenum 21 adapted to conduct the products of combustion to the variable area nozzle 12, at the inlet of the turbine wheel 13.

Figure 1:
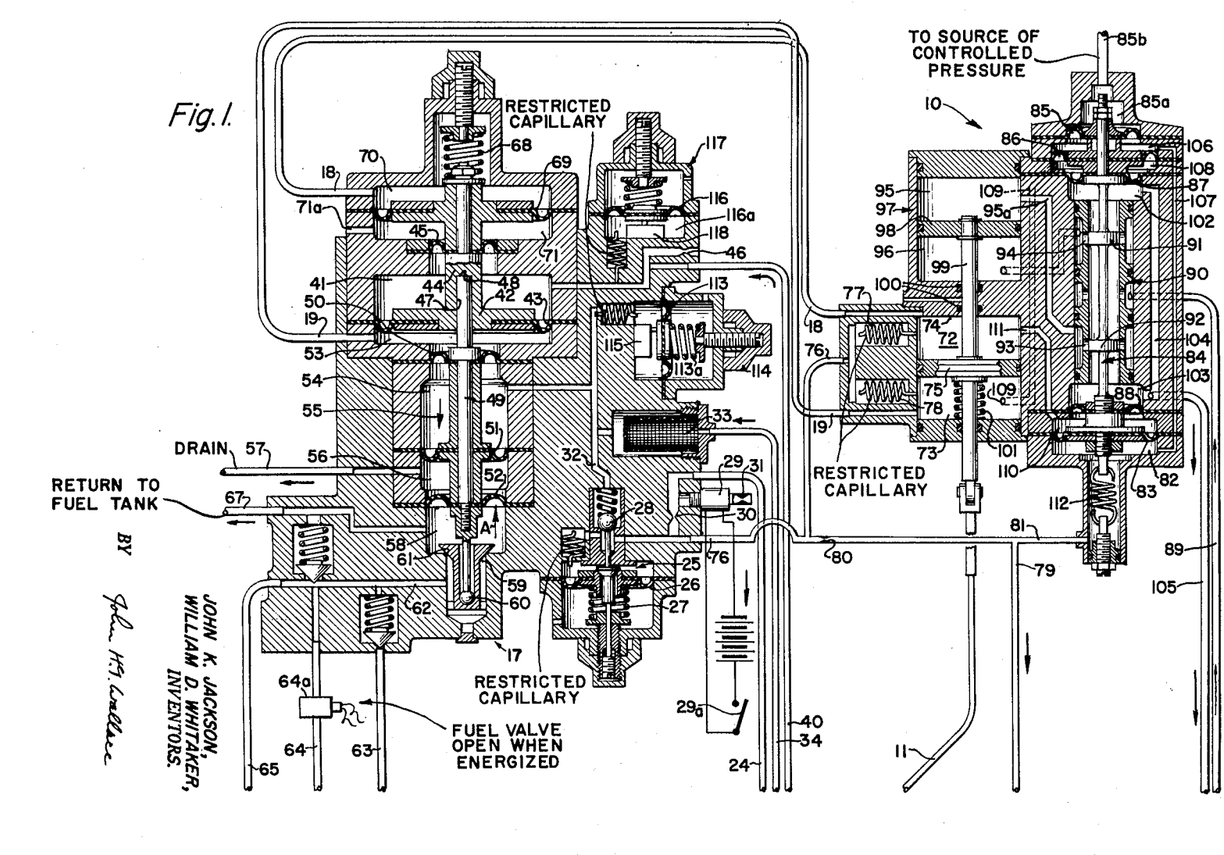
FIGS. 1 and 1A of the drawings are complementary halves of a single diagrammatic view. When placed side by side with FIG. 1 uppermost, they depict a gas turbine control system in accordance with the present invention.
Figure 1A:
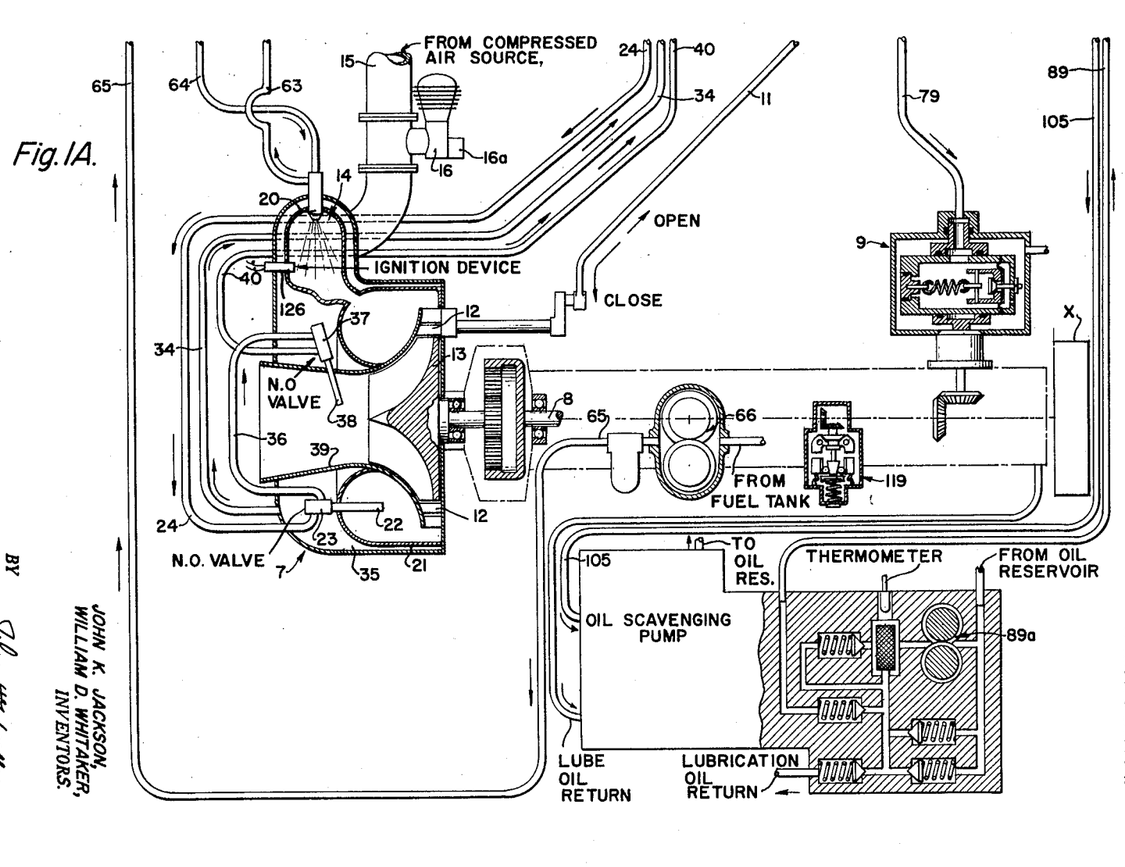

The thermostat 22 is disposed in the turbine inlet plenum 21 and is operatively connected with a valve 23 which is in an open condition when the thermostat is below a predetermined temperature. The valve 23 is connected by a conduit 24 via a restricted orifice 30 to a source of regulated pneumatic pressure maintained by a regulator 25 as shown in FIG. 1. The pressure regulator 25 is a conventional pressure regulator having a pressure sensing diaphragm 26 loaded by a spring 27, which opposes the regulator output pressure as modulated by a valve 28 connected to the diaphragm 26. Fluid pressure entering the valve 28 is conducted thereto via a passage 32, filter 33 and conduit 34, communicating with combustor inlet pressure in a plenum 35 surrounding the combustor 14 and the turbine inlet plenum 21.

A solenoid valve 29, having a bleed-off orifice 31, is disposed to bleed pressure from the conduit 24 downstream of the orifice 30 during starting of the gas turbine motor 7, as will be hereinafter disclosed in the description of operation.

It will be understood that the valve 23 controlled by the thermostat 22 receives regulated control pressure from the regulator 25, through the orifice 30 and conduit 24. Communicating with the outlet of the thermostatic valve 23 is a tube 36 providing a series connection of the valve 23 with the inlet of a normally open thermostatic valve 37. The valve 37 is operated by the thermostat 38, which is located in an exhaust conduit 39 communicating with the outlet of the turbine wheel 13. The thermostatic valve 37 is provided with an outlet conduit 40, which communicates with a chamber 41 in the fuel control 17. Communicating with the chamber 41 is a restricted bleed-off orifice 46, which communicates with atmosphere or a region of pressure lower than that normally existing in the chamber 41. The maximum flow capacities of the thermostatic valves 23 and 37 are greater than the flow capacity of the restricted orifice 46. Thus the pressure in the chamber 41 may be modulated by changes in the flow capacities of the thermostatic valves 23 and 37 which are controlled by the temperatures at the inlet and outlet of the turbine wheel 13 respectively.

Movably mounted in the chamber 41 is a diaphragm support 42 connected to a diaphragm 43 which forms a movable wall of the chamber 41. The diaphragm support 42 is provided with a shaft portion 44 having a sealing diaphragm 45 secured thereto; the sealing diaphragm 45 is smaller in area than the diaphragm 43. The shaft 44 of the diaphragm support 42 is provided with a bore portion 47, in which an end 48 of a diaphragm supporting shaft 49 is positioned. Mounted on the diaphragm supporting shaft 49 are diaphragms 50, 51 and 52. The diaphragm 50 forms the movable wall of a chamber 53, which also communicates with one side of the diaphragm 43. The diaphragms 50 and 51 form opposite movable walls of another chamber 54, which communicates directly with the filter 33 and conduit 34. It will be noted that the area of diaphragm 50 is substantially less than that of the diaphragm 51, whereby any pressure in the chamber 54 creates a force differential with respect to the diaphragms 50 and 51, whereby the shaft 49 is urged in the direction of an arrow 55, as will be hereinafter described. The diaphragms 51 and 52 define opposing walls of a leakage drain chamber 56, which communicates with a drain tube 57 leading to the atmosphere or other suitable waste receiver. On the opposite side of the diaphragm 52, from the chamber 56, is a fuel by-pass chamber 58, communicating with a fuel by-pass valve 59, which is engaged by an end 60 of the diaphragm supporting shaft 49. The valve 59 is engageable with a valve seat 61 formed in the housing of the fuel control 17, and functions generally as a fuel pressure modulating means. Communicating with the seat 61, in opposition to the chamber 58, is a fuel passage 62, which also communicates with conduits 63 and 64 connected to a conventonal spill-back fuel nozzle 20, passage 64 containing a solenoid controlled "on-off" valve 64a which is closed in the de-energized condition. The passage 62 also communicates with a tube 65 conducting fuel under high pressure from the outlet of a fuel pump 66 driven by the turbine shaft 8.

According to a balance of forces exerted on the diaphragm supporting shaft 49 and the diaphragm support 42, fuel pressure in the passage 62 may force the by-pass valve 59 off its seat and permit fuel to be by-passed from the passage 62 to a passage 67 communicating with the chamber 58. Fuel by-passed to the tube 67 returns to a fuel tank, not shown in the drawings, communicating with the fuel pump 66. When fuel is thus by-passed, fuel pressure in the tube 64 is reduced, whereby emission of fuel from the nozzle 20 is corresponding reduced. It will be noted that under normal steady-state operating conditions of the turbine 7, a balance of forces in connection with the diaphragm supporting shaft 49 includes fuel pressure in the passage 62 acting on the fuel valve 59, air pressure in the chamber 54 acting on the diaphragms 50 and 51, together with force exerted by a spring 68 on the diaphragm support 42 and shaft 49.

It will be understood that force of the spring 68 tends to balance force of air pressure acting on the diaphragm 50, while the forces of air pressure acting on the diaphragms 43, 51 and 69 tend to balance fuel pressure in the passage 62 acting on the fuel valve 59. It will be noted that air pressure in the chamber 54 equals that supplied to the combustor 14, and therefore, fuel pressure in the passage 62 must at all times be slightly greater than air pressure in the plenum 35 surrounding the combustor 14 because of the difference in area between diaphragms 50 and 51. Thus, forces acting on the diaphragms 43, 51 and 69 serve to control the minimum fuel pressure in the tube 64 by controlling the position of the fuel by-pass valve 59.

The diaphragm support 42 is adapted to exert reset forces on the fuel by-pass valve 59 during speed changes of the turbine wheel 13, while the thermostats 22 and 38 are in transient operating conditions. In addition to the diaphragm 43, which is coupled to the diaphragm support 42, another diaphragm 69 is fixed to the diaphragm support 42. The housing of the fuel control 17 is provided with chambers 70 and 71 communicating with opposite sides of diaphragm 69.

The chamber 70 communicates with a reset conduit 18, while the chamber 71 communicates with one side of the diaphragm 45 and the atmosphere via an opening 71a. It will be noted that the chambers 53 and 70 are opposed to each other with respect to the diaphragms 69 and 43. The chamber 53 is connected to a reset conduit 19, which serves to communicate pneumatic signals in opposition to those communicated to the chamber 70 via the reset conduit 18.

The reset conduit 18 also communicates with a chamber 72 in the housing of the servomechanism 10, while the reset conduit 19 also communicates with a chamber 73 in the housing of the servomechanism 10. The chambers 72 and 73 form opposite ends of a cylinder 74 in which a piston 75 is reciprocally mounted. In effect, the chambers 72 and 73 and piston 75 are arranged to cause reciprocal pneumatic signals to be transmitted through the tubes 18 and 19, to the chambers 70 and 53, when the piston 75 moves in the cylinder 74.

A conduit 76, communicating with the outlet of the pressure regulator valve 28, supplies control pressure to the chambers 53, 70, 72 and 73 through restricted capillaries 77 and 78, respectively. Such control pressure is also equalized in the chambers 53, 70, 72 and 73 through the capillaries 77 and 78.

Communicating with the control pressure supply conduit 76 is another control pressure supply conduit 79, which is connected to the pneumatic speed sensor 9. This pneumatic speed sensor 9 is similar to that disclosed in a co-pending application of John K. Jackson, Serial No. 391,099, now Patent No. 2,858,839 dated Nov. 4, 1958. The pneumatic speed sensor 9 is arranged to vent pressure from the pressure supply conduit 79 downstream of a restricted orifice 80 when the shaft 8, driven by the turbine wheel 13, exceeds a predetermined speed. It will be noted that the restricted orifice 80 is disposed between the pneumatic speed sensor 9 and the pressure supply conduit 76, which receives pneumatic pressure from the pressure regulator valve 28. Communicating with the pneumatic speed sensor 9 downstream of the orifice 80 is a branch conduit 81, which communicates with a chamber 82 in the housing of the servomechanism 10.

A diaphragm 83 forms a movable wall of the chamber 82 and is connected to a servo-pilot shaft 84 of the servomechanism 10. Diaphragms 85, 86, 87 and 88 are also connected to the servo-pilot shaft 84, the functions of which will be hereinafter described in detail. The servomechanism 10 receives hydraulic fluid under high pressure through a conduit 89 and returns such fluid through the conduit 105 to a reservoir, or other hydraulic fluid supply means (not show) with which the pump 89a communicates. This pump supplies fluid under pressure to the servo-mechanism 10 for the actuation of the variable area nozzles 12. High pressure hydraulic fluid entering the servomechanism through the tube 89 communicates with a valve cylinder 90, in which piston elements 91 and 92 of the servo-pilot shaft 84 are reciprocally mounted. These piston elements 91 and 92 control flow through ports 93 and 94 of the valve cylinder, which communicate with chambers 95 and 96, respectively, of a cylinder 97. Reciprocally mounted in the cylinder 97 is a piston 98 connected to a rod 99 extending through a packing 100 and into the cylinder 74, wherein the rod 99 is fixed to the piston 75. A spring 101 tends to force the rod 99 toward the chamber 95.

Communicating with opposite ends of the valve cylinder 90 and with the piston elements 91 and 92 of the servo-pilot shaft 84, are chambers 102 and 103, respectively. These chambers 102 and 103 intercommunicate by means of a fluid exhaust passage 104 connected with the hydraulic fluid return conduit 105. This conduit 105 returns hydraulic fluid to a scavenging pump 105a which forces the fluid back to an oil reservoir (not shown). The pump 89a draws fluid from such reservoir. The pump 105a forms no part of the present invention. A chamber 106 is disposed between the diaphragms 85 and 86, and a restricted capillary passageway 107 intercommunicates with the chambers 82 and 106, the operation of which will hereinafter be described in detail.

A chamber 108 is disposed between the diaphragms 86 and 87, and a passage 109 intercommunicates with the pneumatic chamber 73 and the chamber 108. A chamber 110, disposed between the diaphragms 83 and 88, communicates with the pneumatic chamber 72 via a passage 111.

It will be noted that the passages 109 and 111 provide for pneumatic feedback forces from the piston 75 to the chambers 108 and 110, whereby a follow-up function is accomplished, relative to actuation of the piston 98 by the servo-pilot shaft 84 and its fluid controlling piston portions 91 and 92.

A spring 112 is connected to the servo-pilot shaft 84 and tends to move the same toward the chamber 82, whereby the piston 92 is held normally open with respect to the port 93 which communicates with the chamber 95. Thus, under static conditions, the servomechanism is receptive to oil pressure in the conduit 89 and chamber 95, which creates a tendency of the piston 98 to force the arm 11 in a direction to move the variable area nozzle 12 toward a closed position.

It will also be noted, however, that the spring 101 normally tends to force the variable area nozzles 12 toward an open position, whereby air pressure, when admitted through the conduit 15, has access to the turbine wheel 13, following which the oil pressure supply pump 89a, driven by the shaft 8 of the turbine wheel 13, forces oil through the servomechanism 10 and into the chamber 95, tending to close the nozzles 12 to a position which corresponds to control exercised by the pneumatic speed sensor 9.

A chamber 85a communicates with the diaphragm 85 in opposition to the chamber 106. A conduit 85b communicates with the chamber 85a, whereby a servo-adjusting force may be pneumatically imposed upon the diaphragm 85. The source of pneumatic pressure in the conduit 85b is no part of the present invention.

When air pressure, internally of the plenum 35, is reduced below a predetermined value, a diaphragm 113 of a low inlet pressure switch actuator 114 senses a reduction of pressure acting thereon, and a spring 113a actuates a switch 115 in circuit with the conventional solenoid operated fuel valve 64a, which causes closing of such valve and the interruption of fuel flow to the combustor.

When the normally open thermostatic valves 23 and 37 are actuated according to a low temperature condition, and permit high pressure to build up in a chamber 116a at one side of a diaphragm 116 of the flame-out pressure switch actuator 117, the diaphragm 116 moves and actuates a switch 118 in circuit with the solenoid operated fuel valve 64a, which causes closing of such valve. The flame-out switch 118 is in series with the switch 115 and either will operate when opened to interrupt fuel flow to the combustor. Switch 115 may be designated as a "low pressure" switch since low pressure will cause it to interrupt fuel flow, whereas switch 118 interrupts fuel flow in response to high pressure. It should be understood at this point that switch 115 is exposed to air pressure introduced directly from the plenum 35 before pressure reduction by regulator 25 and it will be closed when the pressure is about 12 p.s.i.g. Switch 118, however, is exposed to regulated air pressure on the discharge side of the regulator 25 and while normally closed will open when the pressure exceeds 10 p.s.i.g. Such pressure is not normally reached when thermostats 22 and 38 are in actual operation. The respective locations of switches 115 and 118 in the electrical circuit used in the control system will be apparent from FIG. 2 which diagrammatically illustrates such circuit. Upon referring to FIG. 2 it may be observed that the circuit includes an electrical power source 121, one side of this source being grounded as at 122. A conductor 123 leads from the other side of the current source to switch 29a which is identified in FIG. 2 as the GTM start switch. From this switch a line 124 extends to the coil 125 of the fuel relay. Bleed solenoid 29 is connected with line 124 and the ground. A suitable ignition device 126 is also connected with line 124 and the ground, the bleed solenoid 29 and ignition device 126 being energized when switch 29a is closed. The closing of this switch also energizes coil 125 of the fuel relay. The coil 125 is also connected with the ground, as illustrated, but it should be obvious that lines could be extended from each electrical device to the negative side of the power source instead of utilizing ground connections if so desired.

The fuel relay includes two sets of contacts 127 and 128. Also included are contactors 130 and 131, the former being arranged to bridge contacts 127 and the latter being arranged to bridge contacts 128 when coil 125 is energized. The circuit also includes an inlet air relay having a coil 132, two sets of contacts 133 and 134, and two contactors 135 and 136, the contactors serving to bridge the contacts 133 and 134, respectively. The circuit further includes a line 137 leading from line 123 to one side of a pressure actuated switch 118, which, as pointed out above, constitutes a "flame-out" switch. This switch is normally closed but is set to open when exposed to a predetermined pressure, for example, 10 p.s.i. This pressure is not normally reached when the thermostats 22 and 37 are in operation. The flame-out switch 118 comes into operation only in the event the gas turbine motor is operating and, for some reason, the flame in the combustor 14 is blown out. This prevents the generation of the combustible gases in the plenum 21 and the delivery thereof from the exhaust conduit 39 at the outlet of the turbine wheel 13. The switch 118 is connected by a line 138 with one of the contacts 134 of the inlet air relay. The other contact 134 is connected by a line 140 with one side of the low inlet pressure responsive safety switch 115. This switch is a normally open switch which is adjusted to close at pressures above 12 p.s.i. The other side of this switch is connected by line 141 with the solenoid of the fuel valve 64a. A line 142 extends from line 137 to one contact 127, the other contact 127 being connected with the line 138. The purpose of these connections will be set forth hereinafter.

A line 143 also leads from line 137 to one of the contacts 128, the other contact 128 being connected by a branch line 144 with one of the contacts 133. The other contact 133 is connected by a line 145 with one side of a speed responsive switch 119. As indicated in FIG. 2, this speed responsive switch includes two switch sections so connected that when the shaft 8 is rotating below a certain speed, the switch 119 will be open. When the said certain speed is reached, which is substantially above light-off speed, the switch 119 will then be closed and will remain closed until a second predetermined speed is reached, after which the switch 119 will be opened. This switch is also connected with line 143. A line 146 leads from line 144 to the solenoid 16a of the air inlet valve 16. Line 137 contains a normally closed stop switch 147. The circuit is completed by another line 148, which leads from line 123 to line 146, the line 148 containing a normally open switch 150 which is designated as an ATM start switch. In the circuit diagram in FIG. 2 switches 29a and 150 are illustrated as separate elements. It should be obvious that they could be connected for simultaneous operation if so desired.

The operation of the apparatus as a gas turbine motor is initiated by closing the start switch 29a. When this switch is closed, electrical current will flow from the power source through lines 123 and 124 to the coil 125. This coil when energized will cause the contactors 130 and 131 to engage the sets of contacts 127 and 128, respectively. The closing of the start switch 29a also energizes the bleed solenoid 29 and ignition device 126. The engagement of the contactor 131 with contacts 128 completes a circuit from the power source through line 123, stop switch 147, line 143, contacts 128, and line 144, to the coil 132 of the inlet air relay, energizing this coil and moving contactors 135 and 136 into engagement with sets of contacts 133 and 134, respectively. Bridging of contacts 128 also completes a circuit from the power source through line 123, switch 147, line 143, contor 131, and lines 144 and 146 to the air inlet valve solenoid 16a, the energization of this solenoid effecting the opening of valve 16 to supply the turbine motor with air under pressure. This air will flow from the plenum 35 through the combustor 20 and nozzles 12 to the turbine wheel 13 and initiate rotation thereof. The introduction of air to the plenum 35 also supplies air to conduit 34, which leads through the filter 33 to passage 32 in the fuel control unit 17. Some of this air will flow into the normally open pressure switch actuator 114 and be applied to the diaphragm 113 thereof. When this pressure increases above a predetermined value, for example, 12 p.s.i., switch 115 will be closed and current may then flow from the power source through line 123, switch 147, lines 137 and 142, contactor 130, and line 138, to contactor 136. Current will continue through line 140, switch 115, and line 141 to the fuel valve solenoid 64a to effect the opening of the fuel valve. The turbine will thus be supplied with air and fuel and the ignition device will also be energized to effect ignition of the fuel and air mixture in the combustor. The gases of combustion will flow from the combustor through the nozzles 12 and the turbine wheel 13 to increase the speed of rotation previously initiated by the compressed air. As the speed increases, the switch 119 will be closed to complete a circuit to the air inlet valve solenoid through line 123 from the power source, the stop switch 147, lines 137 and 143, switch 119, line 145, contactor 135, and line 146. The coil 132 of the inlet air relay is connected with one contact 133 so that when switch 119 is closed, coil 132 will be in a holding circuit to retain the inlet air relay in a closed condition.

At this time start switch 29a may be released and current flow to the bleed solenoid, the ignition device, and coil 125 of the fuel relay will be interrupted. Current to the air inlet valve solenoid and the fuel valve solenoid will continue to be supplied through the circuit branches leading from the power source through the switches forming a part of the inlet air relay. For example, the air inlet valve solenoid will be supplied with current from the power source through line 123, stop switch 147, lines 137, 143, 145, contactor 135, and line 146. The fuel valve solenoid will be supplied with current from the power source through line 123, stop switch 147, line 137, switch 118, line 138, contactor 136, line 140, switch 115, and line 141.

It will be noted that switch 118 is a normally closed switch which is opened when the pressure in chamber 116a is above 10 p.s.i. This pressure is not reached in chamber 116a, however, during starting and normal operation of the system, since the energization of solenoid 29 bleeds air pressure from line 24 through orifice 31. Shortly after the ignition of the gases, the thermostats 22 and 38 will be heated sufficiently to cause valves 23 and 37 to assume control of the flow of regulated air to line 40, which leads to the chamber 41 of the fuel control mechanism and chamber 116a of the actuator for switch 118. As long as air pressure in chamber 116a is maintained below 10 p.s.i., the circuit to switch contacts 134 through switch 118 will be closed. Switch 118 is merely a safety device to interrupt the admission of fuel to the combustor when the flame in the combustor is extinguished. It has been pointed out above that when the flame is extinguished thermostats 22 and 38 will cool off, permitting valves 23 and 37 to open and allow the flow of regulated air from line 24 through line 40 to the chamber 116a at a rate faster than such air can bleed through orifice 46. The pressure in chamber 116a will increase above 10 p.s.i., causing diaphragm 116 to move to a position permitting switch 118 to open.

The operation of the gas turbine motor may be interrupted at any desired time through the opening of stop switch 147. The supply of current to the inlet air relay coil 132 will thus be interrupted, permitting the switches controlled by the relay to move to open positions.

It has been previously pointed out that the device may be operated as an air turbine motor, this operation being effected by closing the ATM start switch 150. When this switch is closed, current will flow from the source through line 123, switch 150, and lines 148 and 146 to the air inlet valve solenoid 16a. The valve 16 will open, admitting air under pressure to the plenum 35. Current will also flow from line 146 to the inlet air relay coil 132 and effect the bridging of the sets of contacts 133 and 134. The start switch 150 must be held closed until the speed of the turbine wheel increases sufficiently to close switch 119. The holding circuit for the air inlet relay coil will then be completed through line 123, stop switch 147, line 143, switch 119, line 145, and contactor 135. The start switch 150 may then be released, since the circuit to the air inlet valve solenoid will also be completed through the same circuit and line 146. No current will at this time be supplied to the fuel valve solenoid, however, since the fuel relay will not be energized and switch 115 will be open until the pressure in the actuator 114 reaches 12 p.s.i. Switch 118 will open prior to this point, since the valves 23 and 37 are normally open and will admit control air to chamber 116a of switch actuator 117. When this pressure exceeds 10 p.s.i., switch 118 will open.

Operation of the gas turbine control system, in accordance with the present invention, is substantially as follows:

The solenoid valve 29 is a normally closed valve communicating with the orifice 30, and this valve 29 is provided with an outlet orifice 31 which communicates with atmosphere. Thus, when the solenoid valve 29 is energized, it is open and vents fluid pressure from the conduit 24 downstream of the orifice 30. This solenoid valve is energized by manual operation of a switch 29a during starting of the gas turbine motor 7. Concurrent with the closing of the switch 29a, the valve 16 is opened through the energization of solenoid 16a, admitting compressed air to the turbine 13. This causes a supply of fluid pressure to exist in the conduit 34, pressure regulating valve 25 and tube 24.

The orifice 31, during starting of the gas turbine motor 7, is utilized to reduce pressure in the conduit 24, due to the fact that the thermostatic valves 23 and 37, when cold, are fully open. Thus, the pressure bleed-off function of the orifice 31 reduces pressure in the conduit 34 and compensates for the normal pressure reducing restriction provided by the thermostatic valves 23 and 37, whereby pressure in the conduit 40, communicating with the chamber 41 and diaphragm 43, is maintained at a desirable value. Accordingly, the fuel by-pass valve 59 is properly modulated to attain the desired fuel pressure at the nozzle 20 during starting conditions of the gas turbine motor 7. When the gas turbine motor 7 accelerates from a start to governed speed, the thermostats 22 and 38 assume control of the fuel control 17. Concurrently, the switch 29a is opened, permitting the solenoid 29 to close the orifice 31, so that continuous operation of the fuel control 17 may be maintained by the functioning of the thermostatic valves 23 and 37 and the servomechanism 10, which effects transient operation of the fuel by-pass valve 59, as will be hereinafter described.

Compressed air passes through the conduit 15 and valve 16 and enters the plenum 35 of the gas turbine motor. The valve 16 normally regulates pressure of the air to a desired value, and the air passes from the plenum 35 through perforate walls of the combustor 14 and mixes with fuel issuing from the nozzle 20. The fuel air mixture is then burned and the products of combustion pass into the turbine inlet plenum 21, through the variable area nozzle 12 and intermediate the blades of wheel 13 to the exhaust conduit 39 at the outlet of the wheel. The wheel 13 transmits rotary motion to the shaft 8, which drives the pneumatic speed sensor 9, fuel pump 66, and the hydraulic pump 89a, which communicates with the hydraulic fluid conduit 89. When the turbine wheel is operating at substantially constant speed, the thermostats 23 and 38 control the supply of fuel to the nozzle 20 in accordance with the temperatures at the inlet and the outlet of the wheel 13. An excessive temperature sensed by either thermostat causes a decrease of the flow of control fluid, through the conduit 40, to the chamber 41, whereupon constant venting of control pressure by the orifice 46 cooperates to reduce pressure in the chamber 41 at one side of the diaphragm 43, permitting the existence of a slight unbalance of forces acting on the shaft 49, which causes the fuel by-pass valve 59 to be forced toward an open position by fuel pressure acting on the diaphragm 52 in the direction as indicated by the arrow "A" in the drawing. Thus, an over temperature condition at either the inlet or outlet of the turbine wheel 13 causes the fuel by-pass valve 59 to move slightly toward an open position and decreases fuel pressure in the tube 64, which causes a reduction of fuel being emitted from the nozzle 20. As a result, temperature of gases flowing through the wheel 13 is properly reduced.

In the event a large amount of fuel is used to match an excessive load placed upon the gas turbine motor 7, the temperature of gas flowing to the inlet of the wheel 13 will become excessive and be sensed by the thermostat 22. The thermostat 22 will move the thermostatic valve 23 to restrict the flow of control pressure fluid to the chamber 41, which, as hereinbefore described, results in a reduction of fuel issuing from the nozzle 20. In the event the turbine is rapidly unloaded, the thermostat 38 will sense an increase in temperature of the gas exhausted from the wheel 13, causing the thermostatic valve 37 to reduce pressure in the chamber 41, thereby effecting a reduction of fuel delivered by the nozzle 20.

It will be understood that the thermostat 22 is set to actuate at a higher temperature than that of the thermostat 38; for example, the thermostat 22 may be calibrated to operate at a maximum temperature of 1600 degrees before it causes substantial restriction of the flow of pneumatic control fluid through the valve 23. The thermostat 38 may be calibrated to withstand a maximum temperature of 1250 degrees F. before it causes the pneumatic valve 37 to substantially restrict the flow of control fluid therethrough and reduce pressure in the chamber 41, which results in a reduction of fuel being supplied to the combustor 14.

When a load is applied to the shaft 8 of the gas turbine motor and the speed thereof is decreased slightly, the pneumatic speed sensor 9 tends to increase pressure in the conduit 79, and this increased pressure communicates with the chamber 82 via the conduit 81. An increase of pressure in the chamber 82 causes an unbalance of forces acting on the servo-pilot shaft 84, whereby it moves toward the chamber 106 and causes the piston element 91 to open the sleeve valve port 94. Hydraulic fluid is thus permitted to flow from the tube 89 into the chamber 96 and to act on the piston 98, which forces the arm 11 to actuate the variable area nozzle 12 toward an open position, thereby permitting more fluid to flow through the turbine wheel 13 to increase the power output thereof to match the additional load applied thereto. Concurrently, with the actuation of the piston 98 by hydraulic fluid in the chamber 96, hydraulic fluid is exhausted from the chamber 95 through a passage 95a, port 93, chamber 103, and into the hydraulic fluid return conduit 105, as hereinbefore described.

Also, concurrently with the operation of the piston 98, air in the chamber 72 is compressed by the piston 75, while a relative evacuation of the chamber 73 occurs at the opposite side of the piston 75. This action causes an increase of pressure in the chamber 70 of the fuel control 17 and a relative decrease of opposing fluid pressure in the chamber 53 of the fuel control 17. Accordingly, an unbalance is caused with respect to the diaphragms 69 and 43, tending to cause movement of the diaphragm support 42 and diaphragm supporting shaft 49, together with the fuel by-pass valve 59, in a direction as indicated by the arrow 55, toward a closed position of the fuel by-pass valve 59. Fuel pressure is thus increased at the nozzle 20 thereby increasing the amount of fuel supplied in proportion to the increase of turbine inlet area, caused by movement of the variable area nozzles 12, toward an open position.

It will be understood that a reduction in speed of the turbine wheel 13 caused by an increased loading thereof, is first sensed by the pneumatic speed sensor 9. While an increased load applied to the turbine wheel 13 reduces the turbine outlet temperature, it effects the functioning of the thermostatic valve 37 with respect to the fuel by-pass valve 59. Additionally, increased flow through the variable area nozzle tends to cool the thermostat 22 and increase the flow capacity of the thermostatic valve 23. Responses of the thermostats occur more slowly than is normally required for proper fuel control response. Therefore, the reset action of the fuel by-pass valve accomplished by the reset dashpot chambers 72 and 73, effected by movement of the piston 75, assumes control of the fuel by-pass valve 59 during an interim in which the thermostats are in transient opearting condition. The thermostatic valves 23 and 37 modulate pressure in the chamber 41 to match a desired setting of the fuel by-pass valve 59, to accomplish a proper amount of fuel pressure at the nozzle 20, so that the fuel emitted thereby corresponds with the additional flow area of the entrance to the turbine wheel 13, which is afforded by an opening action of the variable area nozzle 12.

It will be noted that capillaries 77 and 78 gradually equalize pressure in the chambers 53, 70, 72 and 73 after a resetting action results from a movement of the piston 75. The time element required for the capillaries 77 and 78 to equalize this pressure is arranged to approximate the time element required for the thermostats 22 and 38 to respond to a temperature change corresponding to a previous load and speed change of the turbine wheel 13.

In the event load of the turbine wheel 13 decreases, the speed sensor 9 first senses a change in speed and affects the servomechanism 10, thereby causing a reset action of the fuel by-pass valve 59, as hereinbefore described. Such reset action permits the fuel by-pass valve 59 to move toward an open position to effect a reduction of fuel being conducted through the nozzle 20 into the combustor 14 previous to action of the thermostats 22 and 38.

The servomechanism 10, in response to a speed change, causes actuation of the piston 75, whereby pneumatic pressure is fed back through the passages 109 and 111 to the chambers 108 and 110, in order to prevent an overshoot in the action of the servo-pilot shaft 84 and its valve pistons 91 and 92. Following a corrective action of the servomechanism 10 and an adjustment of the variable area nozzle 12 the servo-pilot shaft 84 returns to a position in which the piston elements 91 and 92 maintain the ports 93 and 94 closed when the capillaries 77 and 78 equalize pressure in the chambers 72 and 73, communicating with pressure in the chambers 108 and 110 via the passages 109 and 111.

A restricted passage 107 gradually transmits equalizing pressure between the chambers 82 and 106, and the spring 112 balances force of pneumatic pressure in the chamber 106 normally exerted on the diaphragm 85. Thus, the piston portions 91 and 92, after each servo-actuation of the shaft 99, are returned to their null position, in which they close off the ports 93 and 94 of the sleeve valve 90, whereby hydraulic fluid at opposite sides of the piston 98 holds the variable area nozzle 12 in adjusted position.

Various modifications of the present invention may be resorted to within its spirit and scope, as will be apparent to those skilled in the art.

We claim:

1. In a gas turbine control system, the combination of: a turbine having an inlet; a combustor having fuel nozzle means and an outlet, the outlet of said combustor communicating with the inlet of said turbine; means for conducting fuel and an oxidizer under pressure to said combustor for the generation of gases of combustion therein; means for controlling the flow of gases of combustion into the inlet of said turbine; temperature responsive means disposed to sense temperature changes in gases flowing to and from said turbine; a fuel pressure modulating means communicating with said fuel nozzle and disposed to vary the pressure of fuel admitted to said combustor, said temperature responsive means being disposed to control said fuel pressure modulating means; a speed sensing device driven by said turbine; a servomechanism controlled by said speed sensing device, and disposed to operate said combustion gas flow controlling means; a reset means containing a control fluid and operable by said servomechanism, said reset means being disposed to actuate said fuel pressure modulating means concurrently with the operation of said combustion gas flow controlling means, said reset means comprising fluid actuating elements disposed to exert forces on said control fluid in said reset means; and restricted pressure equalizing passage means which gradually dissipate forces exerted on said control fluid by said actuating elements during response of said temperature responsive means and subsequent to operation of said servomechanism, said fuel pressure modulating means and said combustion gas flow controlling means.

2. In a gas turbine control system, the combination of: a turbine having an inlet; a combustor having a fuel nozzle and an outlet, said outlet communicating with the inlet of said turbine; means for conducting fuel and an oxidizer under pressure to said combustor for the generation of gases of combustion therein; flow control means for controlling the flow of gases of combustion into the inlet of said turbine; temperature responsive means disposed to sense temperature changes in gases flowing to and from said turbine; a fuel pressure modulating means communicating with said fuel nozzle and disposed to vary the pressure of fuel admitted thereto, said temperature responsive means being operatively disposed to control said fuel pressure modulating means; a speed sensing device driven by said turbine; a servomechanism controlled by said speed sensing device and disposed to operate said flow control means; a reset means operable by said servomechanism and disposed to actuate said fuel pressure modulating means concurrently with the operation of said flow control means, said reset means comprising a pair of cooperable intercommunicating pneumatic signal transmitting and translating devices, one of which is connected with said servomechanism, and the other of which is connected to said fuel pressure modulating means, whereby movement of said servomechanism actuates one of the devices and thereby transmits a pneumatic signal to the other device and causes operation of said fuel pressure modulating means.

3. In a gas turbine control system, the combination of: a turbine having an inlet; a combustor having a fuel nozzle and an outlet, said outlet communicating with the inlet of said turbine; means for conducting fuel and an oxidizer under pressure to said combustor for the generation of gases of combustion therein; flow control means for controlling the flow of gases of combustion from said combustor into the inlet of said turbine; temperature responsive means disposed to sense temperature changes in gases flowing to and from said turbine; a fuel pressure modulating means communicating with said fuel nozzle and disposed to vary the pressure of fuel communicating therewith, said temperature responsive means being operatively disposed to control said fuel pressure modulating means; a speed sensing device driven by said turbine; a servomechanism controlled by said speed sensing device, and disposed to operate said flow control means; a reset means operable by said servomechanism and disposed to actuate said fuel pressure modulating means concurrently with the operation of said flow control means, said reset means comprising a pair of cooperable intercommunicating pneumatic signal transmitting and translating devices, one of which is connected with said servomechanism and the other of which is connected to said fuel pressure modulating means, whereby movement of said servomechanism actuates one of the devices, which transmits a pneumatic signal to the other device and causes operation of said fuel pressure modulating means; and restricted passage means communicating with said signal transmitting and translating devices and disposed to dissipate said pneumatic signal during the period in which said temperature responsive means responds to a change of temperature induced by operation of said fuel pressure modulating means.

4. In a gas turbine control system, the combination of: a turbine having an inlet; a combustor having an outlet communicating with the inlet of said turbine; means for conducting fuel and an oxidizer under pressure to said combustor for the generation of gases of combustion therein; flow control means for controlling the flow of gases of combustion from said combustor into the inlet of said turbine; temperature responsive means disposed to sense changes in the temperatures of gases flowing to and from said turbine; a variable fuel control means communicating with said combustor and disposed to vary the flow of fuel to said combustor, said temperature responsive means being disposed to actuate said variable fuel control means; means operatively connected with said temperature responsive means for temporarily rendering the same inoperative to actuate said variable fuel control; means for varying the flow of fuel to said combustor during periods of inoperativeness of said temperature responsive means; a speed sensing device driven by said turbine; a servomechanism controlled by said speed sensing device, and disposed to operate said flow control means; and a reset means operable by said servomechanism and disposed to actuate said variable fuel supply means concurrently with the operation of said flow control means.

5. In a gas turbine motor control system, the combination of: a turbine; a combustor having a fuel nozzle and communicating with the inlet of said turbine; means for conducting fuel under pressure to said fuel nozzle; a fuel pressure modulating means communicating with said nozzle; a first thermostat communicating with the inlet of said turbine; a second thermostat communicating with the outlet of said turbine, both of said thermostats being connected to said fuel pressure modulating means and each being operative at a predetermined temperature to control the same; and selectively controlled means operatively connected to said fuel pressure modulating means to vary the flow of fuel to said combustor during periods of ineffectivity of said thermostats independently of turbine speed.

6. In a gas turbine motor control system, the combination of: a turbine having an inlet; a combustor having a fuel nozzle and communicating with the inlet of said turbine; means for conducting fuel under pressure to said fuel nozzle, a fuel bypass valve communicating with said nozzle; a first thermostat exposed to the temperatures of gases at the inlet of said turbine; a second thermostat exposed to the temperatures of gases exhausted from the outlet of said turbine; means for supplying pneumatic control fluid under pressure, each of said thermostats having a pneumatic valve communicating with and modulating the pressure of said control fluid; a first means responsive to said modulated control fluid to control the operation of said fuel bypass valve, said pneumatic valves of said thermostats being disposed in series with each other; and a second means operative to modulate the pressure of said control fluid prior to the time said thermostats reach operating temperatures.

7. In a gas turbine motor control system, the combination of: a turbine having an inlet; a combustor having a fuel nozzle and an outlet, said outlet communicating with the inlet of said turbine; means for conducting fuel under pressure to said fuel nozzle for the generation of gases in said combustor; a fuel pressure modulating means communicating with said nozzle; a first thermostat exposed to the temperatures of gases at the inlet of said turbine; a second thermostat exposed to the temperatures of gases exhausted from the outlet of said turbine, said thermostats being cooperable with each other; a common fluid passage means communicating with both of said thermostats and said fuel pressure modulating means, whereby either of said thermostats is operative to affect the pressure of control fluid in said passage; selectively actuated means operative to control said fuel pressure modulating means during the initiation of operation of said turbine before said thermostats become effective; and speed responsive means operative to control said fuel pressure modulating means during transient operating conditions of said thermostats.

8. A gas turbine control system comprising: a turbine wheel rotatably mounted in a casing; an inlet and outlet formed in said casing for establishing a fluid flow path through said turbine; a combustor having a fuel nozzle, said combustor being connected to said inlet; means for conducting fuel and air under pressure to said combustor; flow control means disposed in said inlet for controlling the flow of gases of combustion through said turbine wheel; temperature responsive means disposed in said flow path; regulating means disposed in said fuel conducting means for controlling the pressure of fuel delivered to said nozzle, said regulating means being controlled by said temperature responsive means; a speed sensing device driven by said turbine and disposed to generate a pneumatic signal proportional to the speed of said turbine wheel, said pneumatic signal being used to operate said flow control means, said pneumatic signal in addition being used to operate said regulating means; and means for dissipating said pneumatic signal during the period required by said temperature responsive means to respond to the change in temperature induced by said pneumatic signal.

9. In a gas turbine control system, the combination of: a turbine having an inlet; variable area nozzle means in said turbine inlet; a combustor communicating with the inlet of said turbine; passage means disposed to conduct fuel and air under pressure to said combustor; temperature responsive means disposed to sense the temperature of gases flowing to said turbine; fuel flow control means in the passage means conducting fuel to said combustor, said fuel flow control means being operatively connected with said temperature responsive means; speed responsive means disposed for actuation by said turbine; actuating means for said variable area nozzle and fuel flow control means, said actuating means being operatively connected to said speed responsive means; and selectively operated means for temporarily rendering said temperature responsive means ineffective to actuate said fuel control means, said selectively operated means being operatively connected with and serving to actuate said fuel control means independently of said speed responsive means.

10. In a gas turbine control system, the combination of: a turbine having an inlet; variable area nozzle means in said turbine inlet; a combustor communicating with said turbine inlet; passage means disposed to conduct fuel and air under pressure to said combustor for the generation of gases therein; flow controlling means in said passage means to govern the admission of fuel to said combustor; means exposed and responsive to the temperature of the gases flowing from said combustor to said turbine; fluid pressure responsive actuating means operatively connected with and actuating said fuel flow controlling means, said actuating means being controlled in part by said temperature responsive means; speed responsive means disposed for actuation by said turbine over a predetermined speed range to assist in the operation of said fuel flow controlling means; a second fluid pressure responsive actuating means operatively connected with said variable area nozzle and said fuel flow controlling means, said second fluid pressure responsive actuating means serving to operate said variable area nozzle and transmit an actuating signal to said fuel flow control means in response to control by said speed responsive means independently of the condition of said temperature responsive means; and means operatively disposed relative to said second fluid pressure responsive actuating means and operating independently of said temperature responsive means for dissipating said signal during a predetermined time period.

11. In a gas turbine control system, the combination of: a turbine having an inlet; variable area nozzle means in said turbine inlet; a combustor communicating with said turbine inlet; passage means disposed to conduct fuel and air under pressure to said combustor for the generation of gases therein; flow controlling means in said passage means to govern the admission of fuel to said combustor; means exposed and responsive to the temperature of the gases flowing from said combustor to said turbine; fluid pressure responsive actuating means operatively connected with said fuel flow controlling means, said actuating means being operatively connected with said temperature responsive means; speed responsive means disposed for actuation by said turbine to assist in the operation of said fuel flow controlling means; a second fluid pressure responsive actuating means operatively connected with said variable area nozzle, said speed responsive means and fuel flow controlling means, said second fluid pressure responsive actuating means being connected to operate said variable area nozzle and said fuel flow control means in response to control by said speed responsive means independently of the condition of said temperature responsive means; and manually operated means for actuating the fuel controlling means independently of the temperature and speed responsive means.

12. In a gas turbine control system, the combination of: a turbine having an inlet; variable area nozzle means in said turbine inlet to control the speed of operation of said turbine; a combustor communicating with said turbine inlet; passage means disposed to conduct fuel and air under pressure to said combustor; flow controlling means in said passage means to govern the admission of fuel to said combustor; fluid pressure responsive actuating means operatively connected with said fuel flow controlling means; thermostatic means disposed adjacent said turbine and operatively connected with said actuating means to govern the operation of said fuel flow controlling means in response to temperature variations in gases flowing from said combustor through said turbine; manually controlled means for operating said fluid pressure responsive actuating means before said thermostatic means reaches operating temperatures; a second fluid pressure responsive actuating means operatively connected with said variable area nozzle means and said first-mentioned fluid pressure responsive actuating means, said second fluid pressure actuating means being operative to adjust said nozzle means and said fuel flow controlling means during transient operating conditions of said thermostatic means; and speed responsive means disposed for actuation by said turbine and operatively connected with said second fluid pressure responsive means to control the operation thereof.

13. In a gas turbine control system, the combination of: a turbine having an inlet; a combustor communicating with the inlet of said turbine; passage means disposed to conduct fuel and air under pressure to said combustor; variable area nozzle means at the inlet of said turbine for controlling the flow of gases from said combustor to said turbine; temperature responsive means disposed to sense the temperatures of gases flowing to said turbine; bypass type fuel flow control means in the passage means conducting fuel to said combustor; fluid pressure responsive means disposed to operate said fuel flow control means to govern the action thereof, said temperature responsive means being operative to modulate the fluid pressures applied to said fluid pressure responsive means in response to changes in temperature of the gases flowing to said turbine; means for temporarily rendering said temperature responsive means ineffective to modulate fluid pressures applied to said fluid pressure responsive means; a second fluid pressure responsive means disposed to operate said variable area nozzle means; valve means for controlling the application of fluid pressure to said second fluid pressure responsive means; speed responsive means disposed for actuation by said turbine and connected with said valve means; and means actuated by said second fluid pressure responsive means for simultaneously transmitting operating signals to the first-mentioned fluid pressure responsive means and said valve means.

14. In a gas turbine control system, the combination of: a turbine having an inlet; a combustor communicating with the inlet of said turbine; passage means disposed to conduct fuel and air under pressure to said combustor; variable area nozzle means at the inlet of said turbine for controlling the flow of gases from said combustor to said turbine; temperature responsive means disposed to sense the temperatures of gases flowing to said turbine; bypass type fuel flow control means in the passage means conducting fuel to said combustor; fluid pressure responsive means disposed to operate said fuel flow control means to govern the action thereof, said temperature responsive means being operative to modulate the fluid pressures applied to said fluid pressure responsive means in response to changes in temperature of the gases flowing to said turbine; means for temporarily rendering said temperature responsive means ineffective to modulate fluid pressures applied to said fluid pressure responsive means; a second fluid pressure responsive means disposed to operate said variable area nozzle means; valve means for controlling the application of fluid pressure to said second fluid pressure responsive means; speed responsive means disposed for actuation by said turbine and connected with said valve means; means actuated by said second fluid pressure responsive means for simultaneously transmitting operating signals to the first-mentioned fluid pressure responsive means and said valve means; and means for dissipating the signals transmitted by said last-named means after a predetermined time period.

15. In a gas turbine control system, the combination of: a turbine having an inlet; a combustor communicating with the inlet of said turbine; passage means disposed to conduct fuel and air under pressure to said combustor; adjustable nozzle means at the inlet of said turbine for controlling the flow of gases from said combustor to said turbine; bypass type fuel flow control means in the passage means conducting fuel to said combustor; fluid pressure responsive means disposed to operate said fuel flow control means to govern the action thereof; temperature responsive means disposed to sense the temperatures of gases flowing to said turbine, said temperature responsive means being operative to modulate the fluid pressures applied to said fluid pressure responsive means in response to temperature changes of the gases flowing to said turbine; a second fluid pressure responsive means disposed to operate said gas flow controlling means; valve means for controlling the application of fluid pressure to said second fluid pressure responsive means; speed responsive means disposed for actuation by said turbine and operatively connected with said valve means; and fluid pressure impulse generating means disposed for actuation by said second fluid pressure responsive means, said impulse generating means being in communication with the first-mentioned fluid pressure responsive means and said valve means and operative when said second fluid pressure means is actuated to effect predetermined operations of said first-mentioned fluid pressure responsive means and said valve means.

16. In a gas turbine control system, the combination of: a turbine having an inlet; a combustor communicating with the inlet of said turbine; passage means disposed to conduct fuel and air under pressure to said combustor; means at the inlet of said turbine for controlling the flow of gases from said combustor to said turbine; bypass type fuel flow control means in the passage means conducting fuel to said combustor; a first fluid pressure responsive means operatively disposed relative to said fuel flow control means to govern the action thereof, said first fluid pressure responsive means having opposed surfaces; temperature responsive means disposed to sense the temperatures of gases flowing to said turbine, said temperature responsive means being operative to modulate the fluid pressures applied to one surface of said first fluid pressure responsive means in response to temperature changes of the gases flowing to said turbine; a second fluid pressure responsive means operatively disposed relative to said gas flow controlling means; valve means for controlling the application of fluid pressure to said second fluid pressure responsive means; a third fluid pressure responsive means disposed to operate said valve means, said third fluid pressure responsive means having opposed fluid pressure receiving surfaces; speed responsive means driven by said turbine and operatively connected with said valve means; means connected for actuation by said second fluid pressure responsive means to transmit reciprocal fluid pressure impulses to the opposed surfaces of said first and third fluid pressure responsive means to effect predetermined operations of said fuel flow control means and said valve means.

17. In a gas turbine motor control system, the combination comprising: a turbine; a combustor having a fuel nozzle, said combustor communicating with the inlet of said turbine; means for conducting fuel under pressure to said fuel nozzle; a fuel pressure modulating means communicating with said nozzle; fluid pressure responsive means operatively engaged with said fuel pressure modulating means to effect the control thereof; thermostatic means exposed to the gases of combustion flowing to and from said turbine; means actuated by said thermostatic means to control the application of fluid pressure to said fluid pressure responsive means; and means selectively operable to prevent the application of fluid pressure to said fluid pressure responsive means until said thermostatic means are in a predetermined condition.

18. In a gas turbine motor control system, the combination comprising: a turbine; a combustor having a fuel nozzle, said combustor communicating with the inlet of said turbine; means for conducting fuel under pressure to said fuel nozzle; a fuel pressure modulating means communicating with said nozzle; fluid pressure responsive means operatively engaged with said fuel pressure modulating means to effect the control thereof; thermostatic means exposed to the gases of combustion flowing to and from said turbine; mean actuated by said thermostatic means to control the application of fluid pressure to said fluid pressure responsive means; and means selectively operable to render said fluid pressure responsive means inactive until said thermostatic means are in a predetermined condition.

19. In a gas turbine motor control system, the combination comprising: a turbine having an inlet; a combustor communicating with the inlet of said turbine; passage means disposed to conduct fuel and air under pressure to said combustor; fuel pressure control means communicating with the passage means conducting fuel to said combustor; a fluid pressure system having pressure responsive means disposed to operate said fuel pressure control means to govern the action thereof; temperature responsive means disposed to sense the temperatures of gases flowing to said turbine and to modulate the fluid pressures applied to said fluid pressure responsive means to control the operation of said fuel pressure control means; an electrically actuated main valve for initiating and interrupting fuel flow to said combustor; and pressure responsive switch means in circuit with said main valve, said switch means also being in fluid pressure communication with said fluid pressure system and operative at a predetermined temperature sensed by said temperature responsive means to actuate said switch means to close said main valve and interrupt fuel flow to said combustor.

20. In a gas turbine motor control system, the combination comprising: a turbine having an inlet; a combustor communicating with the inlet of said turbine; passage means disposed to conduct fuel and air under pressure to said combustor; fuel pressure control means communicating with the passage means conducting fuel to said combustor; an electrically actuated main valve for initiating and interrupting fuel flow to said combustor; means for controlling the operation of said fuel pressure control means having a fluid pressure system communicating with the passage supplying air to said combustor; fluid pressure responsive means disposed to operate said fuel pressure control means and communicating with said fluid pressure system; temperature responsive valve means disposed to sense the temperatures of gases flowing to said turbine and control the application of fluid pressure to said fluid pressure responsive means in accordance with changes in such temperatures; and pressure responsive switch means in circuit with said main valve, said switch means being in fluid pressure communication with said fluid pressure system and operative at a predetermined temperature sensed by said temperature responsive means to actuate said switch means to close said main valve and interrupt fuel flow to said combustor.

21. In a gas turbine motor control system, the combination comprising: a turbine having an inlet; a combustor communicating with the inlet of said turbine; passage means disposed to conduct fuel and air under pressure to said combustor; fuel pressure control means communicating with the passage means conducting fuel to said combustor; means for controlling the operation of said fuel pressure control means having a fluid pressure system communicating with the passage supplying air to said combustor; fluid pressure responsive means disposed to operate said fuel pressure control means and communicating with said fluid pressure system; temperature responsive valve means disposed to sense the temperature of gases flowing to said turbine and control the application of fluid pressure to said fluid pressure responsive means in accordance with changes in such temperatures; a second fluid pressure responsive means disposed to operate said fuel pressure control means; means for generating and applying fluid pressure impulses to said second fluid pressure responsive means in accordance with variations in turbine speed to override the temperature responsive valve means and control the fuel pressure during transient periods of said temperature responsive valve means.

22. In a gas turbine motor control system, the combination comprising: a turbine having an inlet; a combustor communicating with the inlet of said turbine; passage means disposed to conduct fuel and air under pressure to said combustor; fuel pressure control means communicating with the passage means conducting fuel to said combustor; adjustable nozzle means in said turbine inlet to control the flow of gases from the combustor to said turbine; means for controlling the operation of said fuel pressure controlling means having a fluid pressure system communicating with the passage supplying air to said combustor; a first fluid pressure responsive means operatively engaged with said fuel pressure control means and communicating with said fluid pressure system; valve means in said system for controlling the application of fluid pressure to said first fluid pressure responsive means; thermostatic means operatively engaged with said valve means and responsive to temperature changes in the gases flowing to and from said turbine to actuate said valve means; actuating means for said adjustable nozzle means, said actuating means having a power cylinder and piston, the latter being operatively connected with said nozzle means; fluid pressure responsive pilot valve means operative to control the application of fluid under pressure to said actuating means; means responsive to turbine speed to control the application of fluid pressure to said pilot valve means; a second fluid pressure responsive means operatively engaged with said fuel pressure control means; and means communicating with said second fluid pressure responsive means and operated by said actuating means simultaneously with the adjustment of said nozzle means to generate and apply fluid pressure impulses to said second fluid pressure responsive means in accordance with variations in turbine speed to control the fuel pressure during transient periods of said thermostatic means.

References Cited in the file of this patent

UNITED STATES PATENTS

| | | |
|---|---|---|
| 2,219,994 | Jung | Oct. 29, 1940 |
| 2,603,063 | Ray | July 15, 1952 |
| 2,640,313 | Cobb | June 2, 1953 |
| 2,667,743 | Lee | Feb. 2, 1954 |
| 2,695,498 | Szydlowski | Nov. 30, 1954 |
| 2,730,862 | Lamy | Jan. 17, 1956 |
| 2,770,943 | Beale | Nov. 20, 1956 |
| 2,808,702 | Dotson | Oct. 8, 1957 |
| 2,855,029 | Eastman | Oct. 7, 1958 |

UNITED STATES PATENT OFFICE
CERTIFICATE OF CORRECTION

Patent No. 3,046,738                                                                 July 31, 1962

John K. Jackson et al.

It is hereby certified that error appears in the above numbered patent requiring correction and that the said Letters Patent should read as corrected below.

Column 1, line 41, strike out "the"; column 4, line 1, for "corresponding" read -- correspondingly --; column 6, line 21, for "about" read -- above --; column 8, line 55, for "thne" read -- then --; column 10, lines 66 and 67, for "opearting" read -- operating --; line 72, for "of" read -- at --; column 13, line 59, after "passage" insert -- means --; column 14, line 50, after "nozzle" insert -- , said speed responsive means --; column 15, line 21, for "operativevly" read -- operatively --; column 17, line 30, for "mean" read -- means --.

Signed and sealed this 20th day of November 1962.

(SEAL)
Attest:

ERNEST W. SWIDER                                          DAVID L. LADD Attesting Officer                                                 Commissioner of Patents